United States Patent [19]
Finley

[11] Patent Number: 5,433,463
[45] Date of Patent: Jul. 18, 1995

[54] BUCKETEER ON WHEELS

[76] Inventor: Rocky Finley, 2573 Glenrio Dr., San Jose, Calif. 95121-1343

[21] Appl. No.: 257,901

[22] Filed: Jun. 13, 1994

[51] Int. Cl.⁶ .............................................. B62B 1/26
[52] U.S. Cl. ................. 280/47.16; 280/47.34; 280/47.371; 280/79.5
[58] Field of Search ................... 280/79.5, 79.6, 79.7, 280/47.16, 47.371, 47.26, 767, 47.34

[56] References Cited

U.S. PATENT DOCUMENTS

| | | | |
|---|---|---|---|
| D. 296,025 | 5/1988 | Huether | 280/79.5 |
| 1,210,690 | 1/1917 | Philbin | 280/47.16 |
| 1,327,864 | 1/1920 | Everingham | 280/47.16 |
| 1,407,690 | 2/1922 | Berry | 280/47.16 |
| 2,531,131 | 11/1950 | Johnson | 280/79.5 |
| 4,705,282 | 11/1987 | Berfield | 280/47.371 |
| 4,799,699 | 1/1989 | Berfield et al. | 280/79.5 |
| 4,832,354 | 5/1989 | LaFreniere | 280/47.371 |

FOREIGN PATENT DOCUMENTS 302842 2/1989 European Pat. Off. ........... 280/79.5

Primary Examiner—Eric D. Culbreth
Assistant Examiner—Carla Mattix

[57] ABSTRACT

A new and improved bucketeer on wheels containing a bucket having a closed bottom, an open top, and an intermediate surrounding sidewall therebetween. Also having two handle brackets, each handle bracket has a flat first end and a hollow second end. Each flat end is secured to the surrounding sidewall of the bucket by a fastening means. A U-shaped handle has two extending arms. Each extending arm is received in one of each hollow second end of the two handle brackets. A back support has a flat first end, a second end, and an intermediate extent therebetween. The flat first end is secured to the surrounding side wall of the bucket by a fastening means. A support extension having a first end and an off-set second end. The first end is secured to the intermediate extent. The off-set second end is secured to the closed bottom of the bucket. A back caster wheel is secured to the second end of the back support. An axle has two end portions and an intermediate extent therebetween. Two axle brackets are secured to the intermediate extent. Two wheels, each of which, have an aperture therethrough. Each aperture of the two wheels is secured to the two end portions of the axle by a fastening means.

1 Claim, 4 Drawing Sheets

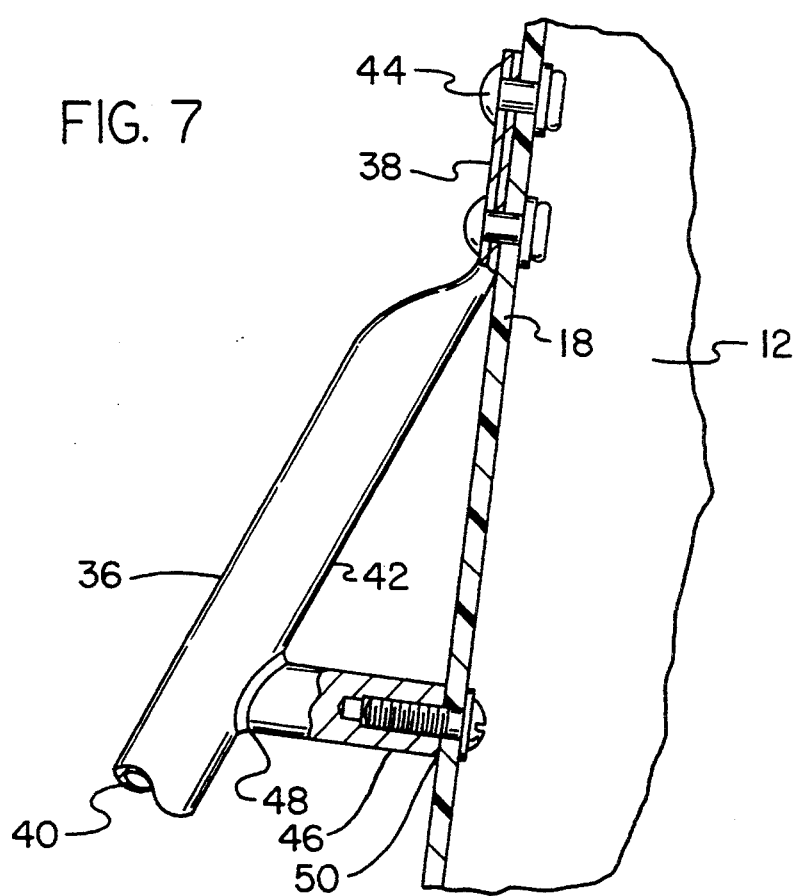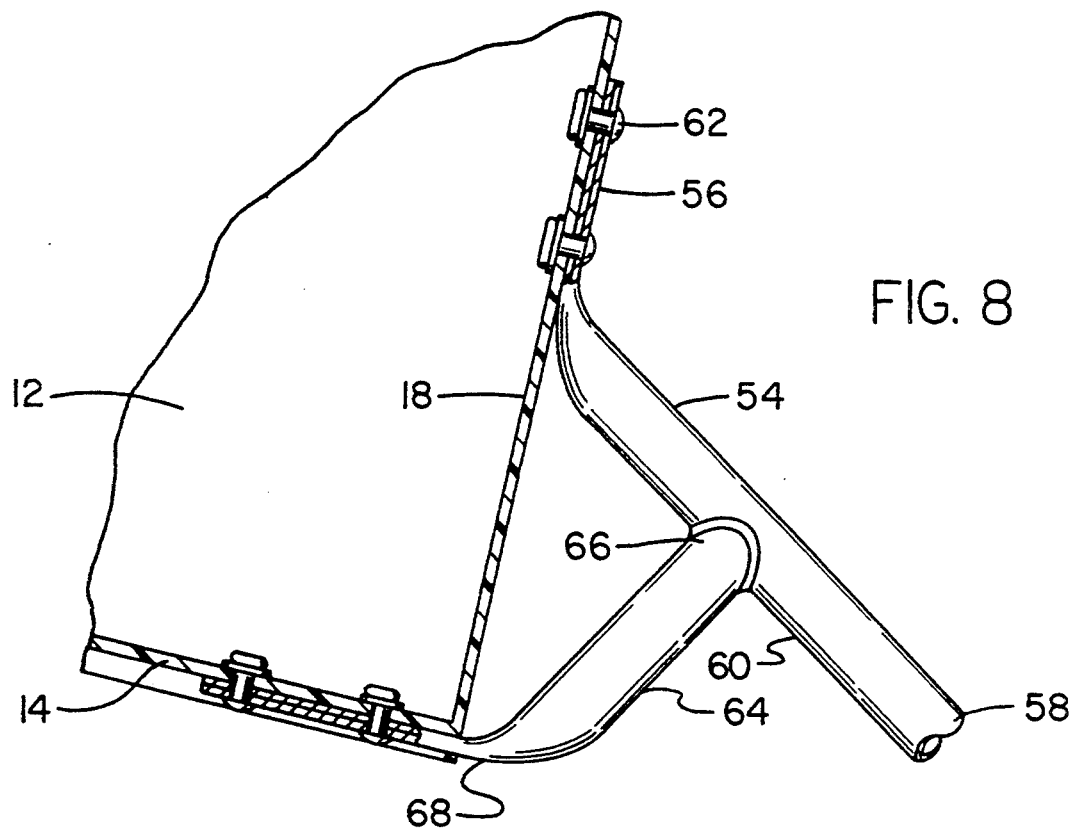

BUCKETEER ON WHEELS

BACKGROUND OF THE INVENTION

1. Field of the Invention

The present invention relates to a bucketeer on wheels and more particularly pertains to allowing the user to push or pull their bucket on wheels with a bucketeer on wheels.

2. Description of the Prior Art

The use of hand carts is known in the prior art. More specifically, hand carts heretofore devised and utilized for the purpose of providing a separate cart to carry objects are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 330,958 to Verbeck discloses the design of a hand cart.

U.S. Pat. No. 5,040,811 to Busken et al. discloses a molded plastic utility cart.

U.S. Pat. No. Des. 303,029 to Friskey discloses the design of a bucket cart.

U.S. Pat. No. 4,735,424 to Stelter,III discloses a utility hand cart.

U.S. Pat. No. Des. 287,776 to Hellwig et al. discloses the design of a cart for transporting wash bucket and accessories.

While these devices fulfill their respective, particular objective and requirements, the aforementioned patents do not describe a bucketeer on wheels that allowing the user to push or pull their bucket on wheels.

In this respect, the bucketeer on wheels according to the present invention substantially departs from the conventional concepts and designs of the prior art, and in doing so provides an apparatus primarily developed for the purpose of allowing the user to push or pull their bucket on wheels.

Therefore, it can be appreciated that there exists a continuing need for new and improved bucketeer on wheels which can be used for allowing the user to push or pull their bucket on wheels. In this regard, the present invention substantially fulfills this need.

SUMMARY OF THE INVENTION

In the view of the foregoing disadvantages inherent in the known types of hand carts now present in the prior art, the present invention provides an improved bucketeer on wheels. As such, the general purpose of the present invention, which will be described subsequently in greater detail, is to provide a new and improved bucketeer on wheels and method which has all the advantages of the prior art and none of the disadvantages.

To attain this, the present invention essentially comprises a bucket having a closed bottom, an open top, and an intermediate surrounding sidewall therebetween. The closed bottom has a plurality of apertures therethrough. The intermediate surrounding sidewall has a plurality of apertures therethrough. The device contains two handle brackets. Each handle bracket has a flat first end and a hollow second end. Each flat end has two apertures formed therethrough. The two apertures are aligned with two of the plurality of apertures that are formed in the surrounding sidewall of the bucket. Each flat end is secured to the surrounding sidewall of the bucket by a fastening means. An aperture is formed adjacent the hollow second end. The device contains a U-shaped handle having two extending arms. Each extending arm is received in one of each hollow second end of the two handle brackets. Two handle adjustment knobs are secured to the each hollow second end of the two handle brackets. Each handle adjustment knob has an adjusting means adjustably received in the aperture adjacent the hollow second end. The device contains a front support having a flat first end, a second end, and an intermediate extent therebetween. The flat first end is secured through one of the plurality of apertures of the surrounding side wall of the bucket by a fastening means. The device also contains a support extension having a first end and a second end. The first end is secured to the intermediate extent. The second end of the support extension is secured to the surrounding sidewall of the bucket through one of the plurality of apertures formed therethrough. A front caster wheel is secured to the second end of the front support. The device contains a back support having a flat first end, a second end, and an intermediate extent therebetween. The flat first end is secured through one of the plurality of apertures of the surrounding side wall of the bucket by a fastening means. The device contains a support extension having a first end and an off-set second end. The first end is secured to the intermediate extent. The off-set second end is secured to the closed bottom of the bucket through one of the plurality of apertures formed therethrough. A back caster wheel is secured to the second end of the back support. The device contains an axle having two end portions and an intermediate extent therebetween. Two axle brackets are secured to the intermediate extent. Each of the two axles have a plurality of apertures therethrough. The apertures are in alignment with the apertures of the closed bottom of the bucket and secured thereon by a fastening means. The two end portions of the axle both have a shoulder ring projection theresecured. Lastly, the device contains two wheels. Each of the two wheels have an aperture therethrough. Each aperture of the two wheels is secured between the shoulder ring projections and the two end portions of the axle by a fastening means.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bucketeer on wheels which has all the advantages of the prior art hand carts and none of the disadvantages.

It is another object of the present invention to provide a new and improved bucketeer on wheels which may be easily and efficiently manufactured and marketed.

It is a further object of the present invention to provide a new and improved bucketeer on wheels which is of durable and reliable construction.

An even further object of the present invention is to provide a new and improved bucketeer on wheels which is susceptible of a low cost of manufacture with regard to both materials and labor, and which accordingly is then susceptible of low prices of sale to the consuming public, thereby making such a bucketeer on wheels economically available to the buying public.

Still yet another object of the present invention is to provide a new and improved bucketeer on wheels which provides in the apparatuses and methods of the prior art some of the advantages thereof, while simultaneously overcoming some of the disadvantages normally associated therewith.

Even still another object of the present invention is to provide a new and improved bucketeer on wheels for allowing the user to push or pull their bucket on wheels.

Lastly, it is an object of the present invention to provide a new and improved bucketeer on wheels containing a bucket having a closed bottom, an open top, and an intermediate surrounding sidewall therebetween. Also having two handle brackets, each handle bracket has a flat first end and a hollow second end. Each flat end is secured to the surrounding sidewall of the bucket by a fastening means. A U-shaped handle has two extending arms. Each extending arm is received in one of each hollow second end of the two handle brackets. A back support has a flat first end, a second end, and an intermediate extent therebetween. The flat first end is secured to the surrounding side wall of the bucket by a fastening means. A support extension having a first end and an off-set second end. The first end is secured to the intermediate extent. The off-set second end is secured to the closed bottom of the bucket. A back caster wheel is secured to the second end of the back support. An axle has two end portions and an intermediate extent therebetween. Two axle brackets are secured to the intermediate extent. The apertures are in alignment with the apertures of the closed bottom of the bucket and secured thereon by a fastening means. The two end portions of the axle both have a shoulder ring projection theresecured. Two wheels, each of which, have an aperture therethrough. Each aperture of the two wheels is secured between the shoulder ring projections and the two end portions of the axle by a fastening means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a view of the front caster support as seen along line 7 of FIG. 2.

FIG. 8 is a view of the back caster support as seen along line 8 of FIG. 2.

The same reference numerals refer to the same parts through the various Figures.

DESCRIPTION OF THE PREFERRED EMBODIMENT

Figure 1:
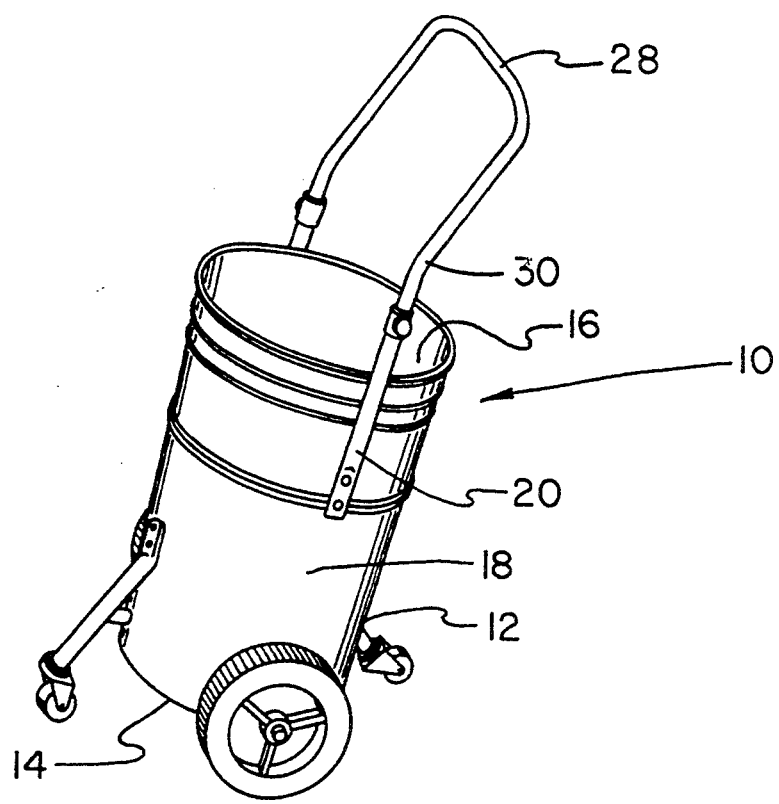
FIG. 1 is a perspective view of the preferred embodiment of the bucketeer on wheels constructed in accordance with the principles of the present invention.
Figure 2:
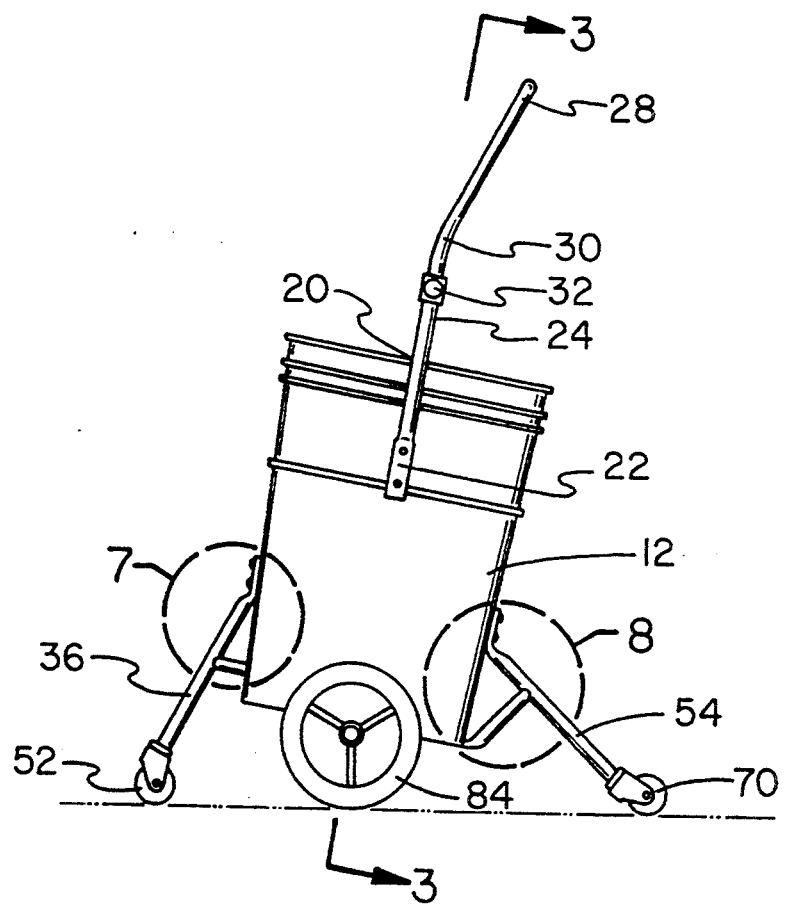
FIG. 2 is a side view of the present invention giving particular detail to the wheel structures.
Figure 3:
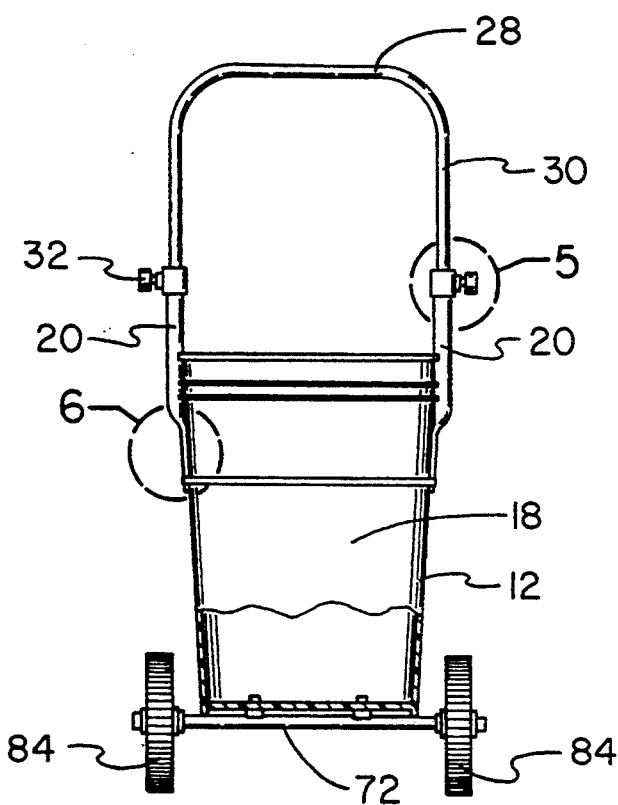
FIG. 3 is a cross-sectional view as seen along line 3—3 of FIG. 2.
Figure 4:
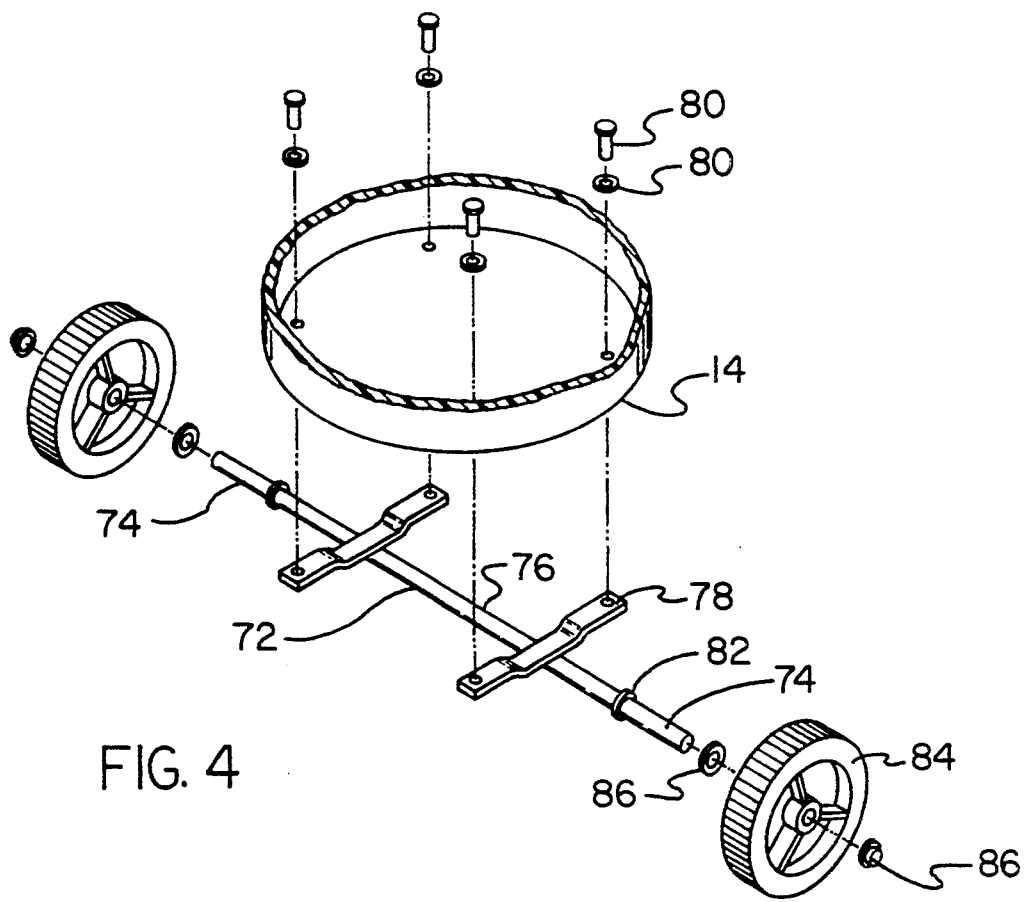
FIG. 4 is an exploded view of the present invention giving particular detail to the side wheels and securement to the bucket.
Figure 5:
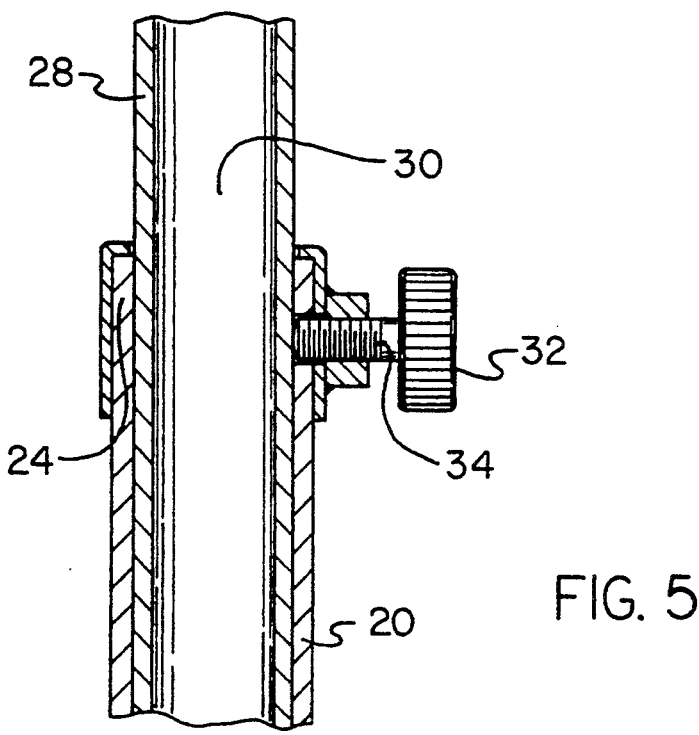
FIG. 5 is an enlarged view of the handle adjustment knobs.
Figure 6:
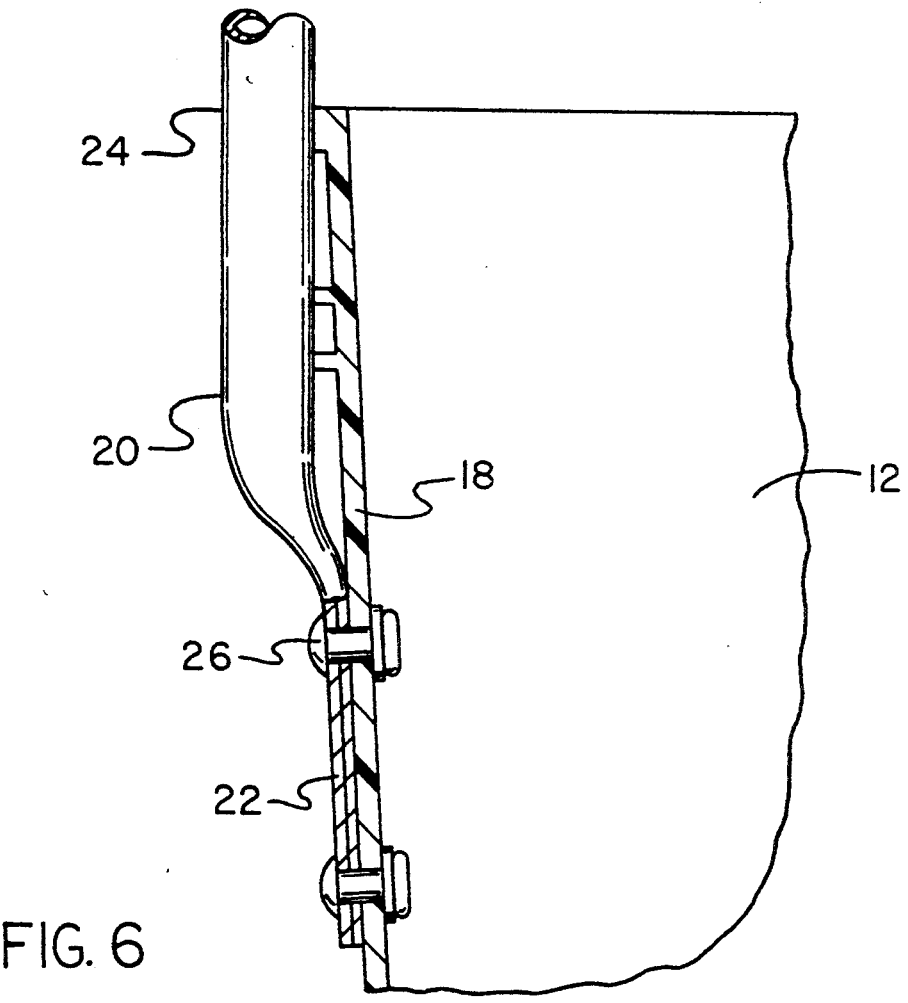
FIG. 6 is a view of the handle attachments taken along line 6 of FIG. 3.

With reference now to the drawings, and in particular, to FIG. 1 thereof, the preferred embodiment of the new and improved bucketeer on wheels embodying the principles and concepts of the present invention and generally designated by the reference number 10 will be described.

Specifically, it will be noted in the various Figures that the device relates to a new and improved bucketeer on wheels for allowing the user to push or pull their bucket on wheels. In its broadest context, the device consists of a bucket, two handle brackets, two handle adjustment knobs, a U-shaped handle, a front support, a back support, an axle, and two wheels.

The device 10 contains a bucket 12 having a closed bottom 14, an open top 16, and an intermediate surrounding sidewall 18 therebetween. The closed bottom 14 has a plurality of apertures therethrough. The intermediate surrounding sidewall 18 has a plurality of apertures therethrough. The size of the bucket 12 can be a variety, ranging from small (18 inches high) to large (48 inches high) depending on the preference of the user and the amount of tools or whatever the user needs to transport.

The device 10 contains two handle brackets 20. Each handle bracket 20 has a flat first end 22 and a hollow second end 24. Each flat first end 22 has two apertures formed therethrough. The two apertures are aligned with two of the plurality of apertures that are formed in the surrounding sidewall 18 of the bucket 12. Each flat first end 22 is secured to the surrounding sidewall 18 of the bucket 12 by a fastening means 26. The fastening means 26 in this case would be either a removable nut and bolt or a lock bolt. An aperture is formed adjacent the hollow second end 24.

The device 10 contains a U-shaped handle 28 having two extending arms 30. Each extending arm 30 is received in one of each hollow second end 24 of the two handle brackets 20.

Two handle adjustment knobs 32 are secured to the each hollow second end 24 of the two handle brackets 20. Each handle adjustment knob 32 has an adjusting means 34 adjustably received in the aperture adjacent the hollow second end 24. The adjusting means 34 allows the U-shaped handle 28 to be raised or lowered through the two handle brackets 20 depending on the size of the user or the amount of leverage the user would require to transport the bucket.

The device 10 contains a front support 36 having a flat first end 38, a second end 40, and an intermediate extent 42 therebetween. The flat first end 38 is secured through one of the plurality of apertures of the surrounding side wall 18 of the bucket 12 by a fastening means 44. The fastening means 44 used would have to be of a strong metallic material that could withstand a tremendous amount of pressure. The device 10 also contains a support extension 46 having a first end 48 and a second end 50. The first end 48 is secured to the intermediate extent 42. The second end 50 of the support extension 46 is secured to the surrounding sidewall 18 of the bucket 12 through one of the plurality of apertures formed therethrough. A front caster wheel 52 is secured to the second end 40 of the front support 36. The caster wheels 52 provide stability for the device 10 and should be made of a durable rubber material.

The device 10 contains a back support 54 having a flat first end 56, a second end 58, and an intermediate extent 60 therebetween. The flat first end 56 is secured through one of the plurality of apertures of the surrounding side wall 18 of the bucket 12 by a fastening means 62. The device 10 contains a support extension 64 having a first end 66 and an off-set second end 68. The first end 64 is secured to the intermediate extent 60. The off-set second end 68 is secured to the closed bottom 14 of the bucket 12 through one of the plurality of apertures formed therethrough. A back caster wheel 70 is secured to the second end 58 of the back support 54. If the device 10 were to need a stronger support, between the front support 36 and the back support 54, the back support 54 would need to be the strongest because it will support most of the load that is carried.

The device 10 contains an axle 72 having two end portions 74 and an intermediate extent 76 therebetween. Two axle brackets 78 are secured to the intermediate extent 76. Each of the two axles 78 have a plurality of apertures therethrough. The apertures are in alignment with the apertures of the closed bottom 14 of the bucket 12 and secured thereon by a fastening means 80. The fastening means employed is a rivet and washer. The two end portions 74 of the axle 72 both have a shoulder ring projection 82 theresecured. The shoulder ring projections 82 serve to prevent a wheel from sliding down the intermediate extent 76 of the axle 72.

Lastly, the device 10 contains two wheels 84. Each of the two wheels 84 have an aperture therethrough. Each aperture of the two wheels is secured between the shoulder ring projections 82 and the two end portions 74 of the axle 72 by a fastening means 86. The fastening means 86 used would be an axle nut and a washer.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved bucketeer on wheels for allowing the user to push or pull their bucket on wheels comprising, in combination:

a bucket having a closed bottom, an open top, and an intermediate surrounding sidewall therebetween, the closed bottom having a plurality of apertures therethrough, the intermediate surrounding sidewall having a plurality of apertures therethrough;

two handle brackets, each handle bracket having a flat first end and a hollow second end, each flat end having two apertures formed therethrough, the two apertures aligned with two of the plurality of apertures formed in the surrounding sidewall of the bucket, each flat end secured to the surrounding sidewall of the bucket by a fastening means, an aperture formed adjacent the hollow second end;

two handle adjustment knobs secured to the each hollow second end of the two handle brackets, each handle adjustment knob having an adjusting means adjustably received in the aperture adjacent the hollow second end;

a U-shaped handle having two extending arms, each extending arm received in one of each hollow second end of the two handle brackets;

a front support having a flat first end, a second end, and an intermediate extent therebetween, the flat first end secured through one of the plurality of apertures of the surrounding side wall of the bucket by a fastening means, a support extension having a first end and a second end, the first end secured to the intermediate extent, the second end of the support extension secured to the surrounding sidewall of the bucket through one of the plurality of apertures formed therethrough, a front caster wheel secured to the second end of the front support;

a back support having a flat first end, a second end, and an intermediate extent therebetween, the flat first end secured through one of the plurality of apertures of the surrounding side wall of the bucket by a fastening means, a support extension having a first end and an inwardly curved second end, the first end secured to the intermediate extent, the inwardly curved second end secured to the closed bottom of the bucket through one of the plurality of apertures formed therethrough, a back caster wheel secured to the second end of the back support;

an axle having two end portions and an intermediate extent therebetween, two axle brackets secured to the intermediate extent, each of the two axle brackets having a plurality of apertures therethrough, the apertures in alignment with the apertures of the closed bottom of the bucket and secured thereon by a fastening means, the two end portions of the axle both having a shoulder ring projection theresecured;

two wheels, each of the two wheels having an aperture therethrough, each aperture of the two wheels secured between the shoulder ring projections and the two end portions of the axle by a fastening means.

* * * * *